United States Patent
Bandyopadhyay et al.

(10) Patent No.: US 11,567,974 B2
(45) Date of Patent: Jan. 31, 2023

(54) METHOD AND SYSTEM FOR HIERARCHICAL TIME-SERIES CLUSTERING WITH AUTO ENCODED COMPACT SEQUENCE (AECS)

(71) Applicant: Tata Consultancy Services Limited, Mumbai (IN)

(72) Inventors: Soma Bandyopadhyay, Kolkata (IN); Anish Datta, Kolkata (IN); Arpan Pal, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 201 days.

(21) Appl. No.: 17/208,395

(22) Filed: Mar. 22, 2021

(65) Prior Publication Data

US 2021/0319046 A1 Oct. 14, 2021

(30) Foreign Application Priority Data

Apr. 7, 2020 (IN) .............................. 202021015292

(51) Int. Cl.
  *G06F 16/28* (2019.01)
  *G06N 3/04* (2006.01)
  *G06N 3/08* (2006.01)

(52) U.S. Cl.
  CPC ............. *G06F 16/285* (2019.01); *G06N 3/04* (2013.01); *G06N 3/08* (2013.01)

(58) Field of Classification Search
  CPC ...... G06F 16/285; G06F 17/175; G06F 17/18; G06N 3/04; G06N 3/08; G06V 20/698; G06K 9/6218

(Continued)

(56) References Cited

U.S. PATENT DOCUMENTS 10,467,526 B1 * 11/2019 Appalaraju .......... G06V 10/449
2019/0135300 A1 5/2019 Gonzalez Aguirre et al.
(Continued)

OTHER PUBLICATIONS

Naveen Sai Madiraju et al., "Deep Temporal Clustering: Fully Unsupervised Learning of Time-Domain Features," Machine Learning, Feb. 2018, Publisher: Arxiv, Link: https://arxiv.org/pdf/1802.01059.pdf.

*Primary Examiner* — Evan Aspinwall
(74) *Attorney, Agent, or Firm* — Finnegan, Henderson, Farabow, Garrett & Dunner, LLP

(57) ABSTRACT

Conventional hierarchical time-series clustering is highly time consuming process as time-series are characteristically lengthy. Moreover, finding right similarity measure providing best possible hierarchical cluster is critical to derive accurate inferences from the hierarchical clusters. Method and system for Auto Encoded Compact Sequences (AECS) based hierarchical time-series clustering that enables compact latent representation of time-series using an undercomplete multilayered Seq2Seq LSTM auto encoder followed by generating of HCs using multiple similarity measures is disclosed. Further, provided is a mechanism to select the best HC among the multiple HCs on-the-fly, based on an internal clustering performance measure of Modified Hubert statistic τ. Thus, the method provides time efficient and low computational cost approach for hierarchical clustering for both on univariate and multivariate time-series. AECS approach provides a constant length sequence across diverse length series and hence provides a generalized approach.

13 Claims, 11 Drawing Sheets

(58) Field of Classification Search
USPC .......................................................... 707/737
See application file for complete search history.

(56) References Cited

U.S. PATENT DOCUMENTS

2019/0188065 A1    6/2019  Anghel et al.
2019/0354850 A1*  11/2019  Watson .................... G06N 3/08
2020/0193552 A1*   6/2020  Turkelson ............ G06V 10/454

* cited by examiner

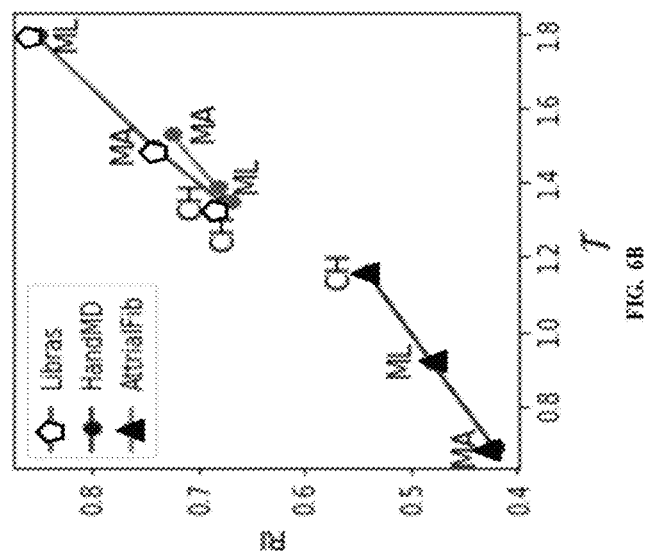
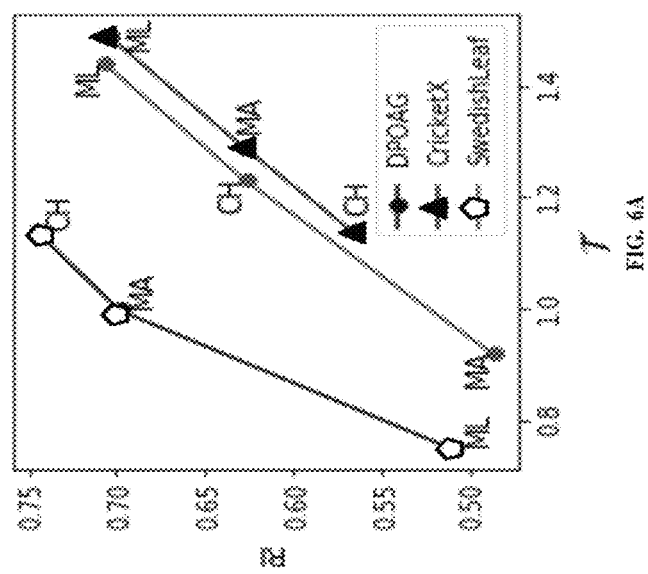
FIG. 6A
FIG. 6B

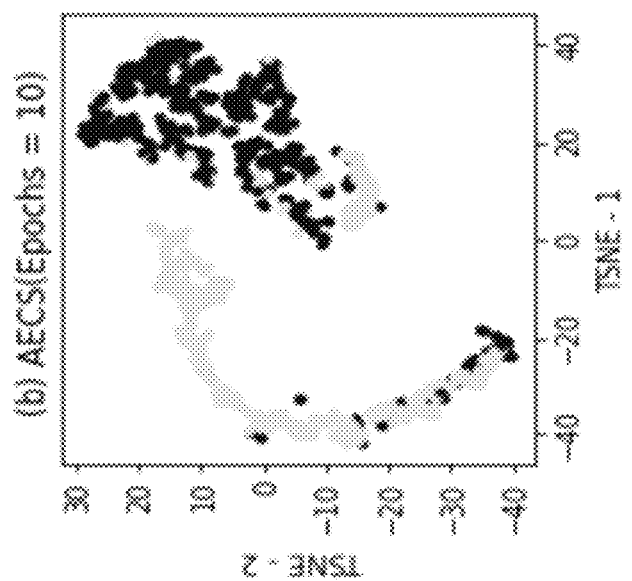
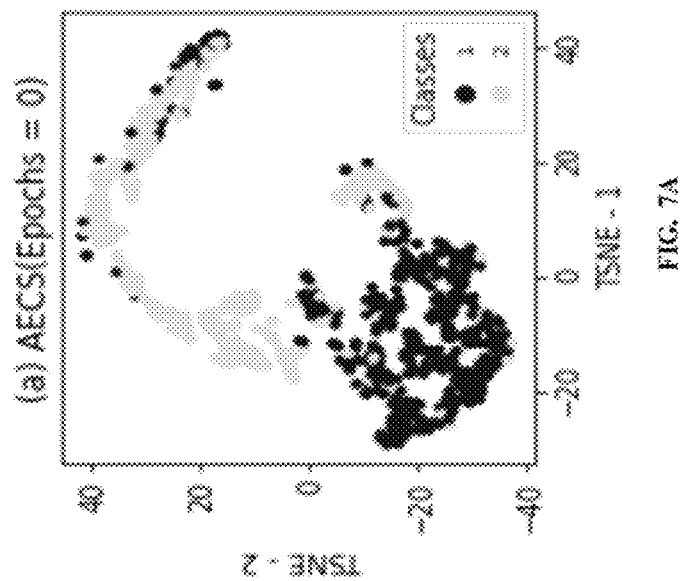
FIG. 7A
FIG. 7B

METHOD AND SYSTEM FOR HIERARCHICAL TIME-SERIES CLUSTERING WITH AUTO ENCODED COMPACT SEQUENCE (AECS)

PRIORITY CLAIM

This U.S. patent application claims priority under 35 U.S.C. § 119 to: Indian patent application no. 202021015292, filed on Apr. 7, 2020. The entire contents of the aforementioned application are incorporated herein by reference.

TECHNICAL FIELD

The embodiments herein generally relate to the field of time-series clustering and, more particularly, to method and system for hierarchical time-series clustering with Auto Encoded Compact Sequence (AECS).

BACKGROUND

Large volume of time-series data is received from applications such as smart cities, continuous health care monitoring, machine health monitoring and so on. This huge volume of time-series data is analyzed by data miners to derive inferences and provide predictions of events. Data clustering is common technique used for processing time-series data during in data mining process. Hierarchical clustering of time-series is one important and frequently used approach in time-series data analysis. For example, very large volume of time-series data acquired over a period from multiple cities across multiple cities may be analyzed to determine similar patterns in violent crime rates over time. Here hierarchical time-series cluster analysis can be used to derive such inferences. The hierarchical clustering is a statistical technique, which builds clusters based on a similarity/distance measure applied on the time-series data.

Conventional hierarchical time-series clustering is highly time consuming process. Moreover, finding the right similarity/distance measure providing best possible Hierarchical cluster (HC) is critical. Considering the length of each time-series data, generating hierarchical time-series clusters using conventional approaches is not time nor computation efficient, effectively not cost efficient.

SUMMARY

Embodiments of the present disclosure present technological improvements as solutions to one or more of the above-mentioned technical problems recognized by the inventors in conventional systems. For example, in one embodiment, a method for hierarchical time-series clustering with Auto Encoded Compact Sequence (AECS) is provided.

The method comprises receiving a plurality of time-series, wherein each of the plurality of time-series is of a length (n) and generating compact representation of each of the plurality of time-series to obtain a plurality of Auto Encoded Compact Sequences (AECS) of a constant length using a multilayered Seq2Seq Long Short-Term Memory (LSTM) auto encoder, wherein each of the plurality of AECS captures significant features of corresponding each of the plurality of time-series. Further, the method comprises clustering the plurality of AECS using an agglomerative hierarchical clustering to generate a plurality of Hierarchical Clusters (HCs comprising a Chebyshev (CH) cluster obtained using a CH distance as a similarity measure, a Mahalanobis (ML) cluster obtained using a ML distance as the similarity measure and a Manhattan (MA) cluster obtained using a MA distance as the similarity measure. Further, the method comprises selecting a best HC among the plurality of HCs based on a modified Hubert statistics ($\tau$) used as an internal clustering measure, wherein the best hierarchical cluster has highest rank of modified Hubert statistics ($\tau$).

In another aspect, a system for hierarchical time-series clustering with Auto Encoded Compact Sequence (AECS) is provided. The system comprises a memory storing instructions; one or more Input/Output (I/O) interfaces; and one or more hardware processors coupled to the memory via the one or more I/O interfaces, wherein the one or more hardware processors are configured by the instructions to receive a plurality of time-series, wherein each of the plurality of time-series is of a length (n) and generate compact representation of each of the plurality of time-series to obtain a plurality of Auto Encoded Compact Sequences (AECS) of a constant length using a multilayered Seq2Seq Long Short-Term Memory (LSTM) auto encoder, wherein each of the plurality of AECS captures significant features of corresponding each of the plurality of time-series. Further, the one or more hardware processors are configured to cluster the plurality of AECS using an agglomerative hierarchical clustering to generate a plurality of Hierarchical Clusters (HCs comprising a Chebyshev (CH) cluster obtained using a CH distance as a similarity measure, a Mahalanobis (ML) cluster obtained using a ML distance as the similarity measure and a Manhattan (MA) cluster obtained using a MA distance as the similarity measure. Furthermore, the one or more hardware processors are configured to select a best HC among the plurality of HCs based on a modified Hubert statistics ($\tau$) used as an internal clustering measure, wherein the best hierarchical cluster has highest rank of modified Hubert statistics ($\tau$).

In yet another aspect, there are provided one or more non-transitory machine readable information storage mediums comprising one or more instructions, which when executed by one or more hardware processors causes a method for hierarchical time-series clustering with Auto Encoded Compact Sequence (AECS).

The method comprises receiving a plurality of time-series, wherein each of the plurality of time-series is of a length (n) and generating compact representation of each of the plurality of time-series to obtain a plurality of Auto Encoded Compact Sequences (AECS) of a constant length using a multilayered Seq2Seq Long Short-Term Memory (LSTM) auto encoder, wherein each of the plurality of AECS captures significant features of corresponding each of the plurality of time-series. Further, the method comprises clustering the plurality of AECS using an agglomerative hierarchical clustering to generate a plurality of Hierarchical Clusters (HCs comprising a Chebyshev (CH) cluster obtained using a CH distance as a similarity measure, a Mahalanobis (ML) cluster obtained using a ML distance as the similarity measure and a Manhattan (MA) cluster obtained using a MA distance as the similarity measure. Further, the method comprises selecting a best HC among the plurality of HCs based on a modified Hubert statistics ($\tau$) used as an internal clustering measure, wherein the best hierarchical cluster has highest rank of modified Hubert statistics ($\tau$).

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 6A and FIG. 6B illustrates analysis of a modified Hubert statistics (T) with the RI for three similarity measures for three univariate time-series datasets and three multivariate time-series data sets respectively, in accordance with some embodiments of the present disclosure.

FIG. 7A through FIG. 7D depict two dimensional representation of generated AECS using the multilayered Seq2Seq LSTM auto encoder, in accordance with some embodiments of the present disclosure.

DETAILED DESCRIPTION OF EMBODIMENTS

Figure 1:
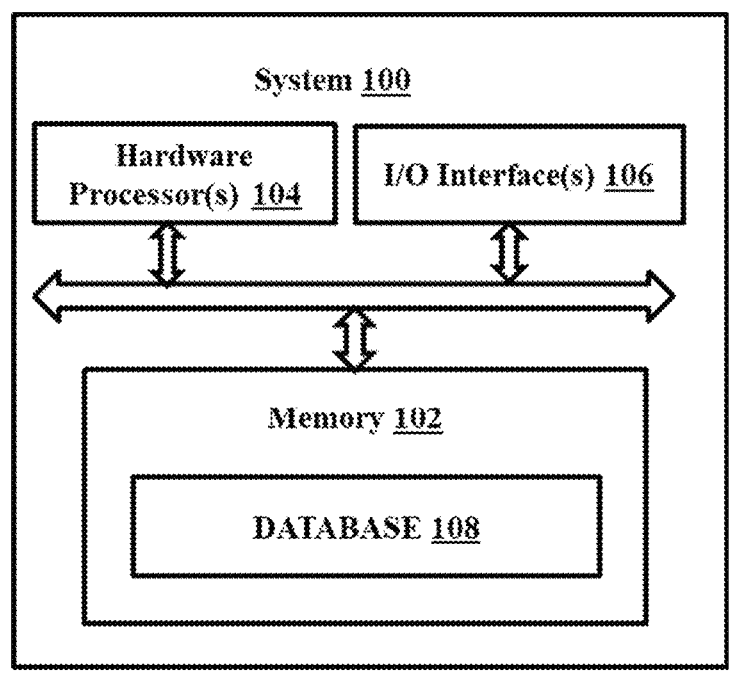
FIG. 1 illustrates a functional block diagram of a system for hierarchical time-series clustering with Auto Encoded Compact Sequence (AECS), in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Conventional hierarchical time-series clustering is highly time consuming process. Moreover, finding the right similarity measure providing best possible Hierarchical cluster (HC) is critical to derive accurate inferences speedily from the hierarchically clustered time-series data. Considering the length time-series, hierarchical time-series cluster generation using conventional approaches is not time efficient nor computation efficient and effectively not cost efficient. Hierarchical clustering algorithms create hierarchy of data into a tree-like structure (dendrogram) either using an bottom-up (Agglomerative) or top-down approach (Divisive). Unlike partition based clustering this does not require the number of clusters to be formed. One of the most used approaches for hierarchical clustering in literature performs hierarchical clustering with a parametric Dynamic Time Warping (DTW) derivative (DDTW) distance measure showing the used hierarchical clustering approach outperforming K-Means. The literature focusses on only univariate time-series. Further, requires longer computing time as finding DTW between any pair of time-series is extremely computation heavy.

Embodiments herein provide a method and system for hierarchical time-series clustering with Auto Encoded Compact Sequence (AECS) enabling compact latent representation of both univariate and multivariate time-series using an undercomplete multilayered Seq2Seq Long Short-Term Memory (LSTM) auto encoder followed by generation of Hierarchical Clusters (HCs) of the time-series data using multiple similarity measures. Further, provided is a mechanism to select the best HC, from the multiple HCs generated, based on an internal clustering performance measure, referred as a modified Hubert statistic ($\tau$). The method addresses high computational cost problem of hierarchical clustering of time-series for both univariate and multivariate time-series. Further the AECS approach provides a constant length sequence across diverse length series and hence provides a generalized approach with reduced length of time-series contributing to faster computation and speedy clustering.

The AECS disclosed herein provides a method to convert both univariate and multivariate time-series into a fixed length compact latent representation of the time-series with the compact representation capturing all the significant features of the time-series data. Such compact representations considerably reduces time steps per time-series that need to be processed during hierarchical clustering of the time-series data. The method disclosed provides a single computation efficient solution that can cluster the varying length univariate or multivariate time-series incoming sample data into hierarchical clusters, in a time efficient and computationally efficient manner.

Referring now to the drawings, and more particularly to FIGS. 1 through 8B, where similar reference characters denote corresponding features consistently throughout the figures, there are shown preferred embodiments and these embodiments are described in the context of the following exemplary system and/or method.

FIG. 1 illustrates a functional block diagram of a system 100 for hierarchical time-series clustering with Auto Encoded Compact Sequence (AECS), in accordance with some embodiments of the present disclosure.

In an embodiment, the system 100 or includes a processor(s) 104, communication interface device(s), alternatively referred as input/output (I/O) interface(s) 106, and one or more data storage devices or a memory 102 operatively coupled to the processor(s) 104. The system 100, with one or more processors (104), is configured to execute functions of one or more functional blocks of the system 100. The functional blocks are explained in conjunction with an example architectural overview of the system 100 in FIG. 2.

Referring to the components of the system 100, the processor(s) 104, interchangeably referred as can be one or more hardware processors 104, can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In an embodiment, the system 100 can be implemented in a variety of computing systems including laptop computers, notebooks, hand-held devices such as mobile phones, workstations and the like.

The I/O interface(s) 106 can include a variety of software and hardware interfaces, for example, a web interface, a graphical user interface and the like and can facilitate multiple communications within a wide variety of networks N/W and protocol types, including wired networks, for example, LAN, cable, etc., and wireless networks, such as WLAN, cellular, or satellite. In an embodiment, the I/O interface (s) 106 can include one or more ports for connecting a number of devices (nodes) of the system 100 to one another or to another server. Further the I/O interface 106 provides interface to receive the plurality of time-series data from one or more external sources or share the generated HCs for further data analytics to external system such as a server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. Further, the memory 102 may include a database 108, which can store processed time-series data, modules such multilayered Seq2Seq Long Short-Term Memory (LSTM) auto encoder (shown in FIG. 2), modules corresponding to a plurality of similarity measures used for generating HCs, generated HCs and the like. In an embodiment, the database 108 may be external to the system 100 (not shown) and coupled to the system via the I/O interface 106. Further, the memory 102 may comprise information pertaining to input(s)/output(s) of each step performed by the processor(s) 104 of the system 100 and methods of the present disclosure. Functions of the components of system 100 are explained in conjunction with and example architectural overview of the system 100 described in FIG. 2, the multilayered Seq2Seq Long Short-Term Memory (LSTM) auto encoder of FIG. 3, flow diagram of FIG. 4, and experimental results and analysis of FIGS. 5 through 8B.

Figure 2A:
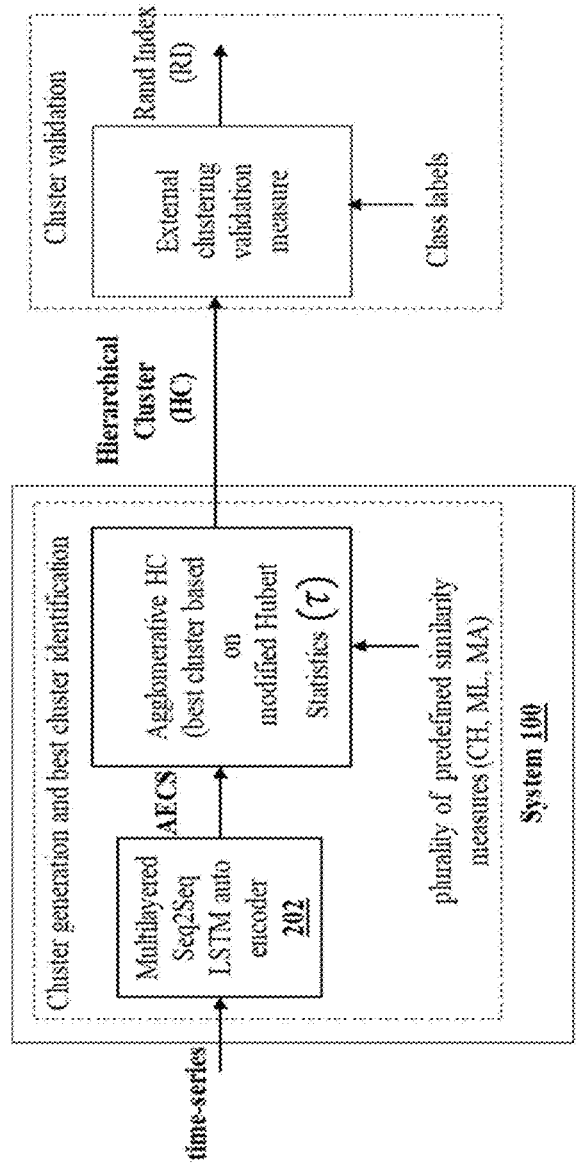
FIG. 2A illustrates an example architectural overview of the system of FIG. 1, in accordance with some embodiments of the present disclosure.

FIG. 2A illustrates an example architectural overview of the system 100 of FIG. 1, in accordance with some embodiments of the present disclosure. The system receives data corresponding to a plurality of time-series which is learnt to generate auto encoded compact sequence (AECS), a latent representation. For experimental analysis of the system 100, the time-series data is obtained from an archive, for example herein University of California Riverside (UCR) archive. However, received multiple time-series, to be clustered using the system 102, can be time-series data generated form any application such as machine health monitoring, smart cities or the like. A multilayered Seq2Seq Long Short-Term Memory (LSTM) auto encoder 202 generates the AECS, which are then hierarchically clustered using different similarity measures to generate multiple HCs corresponding to each similarity measured used. The system 100 encompasses exploiting distance/similarity measures like Mahalanobis (ML) distance measure, Chebyshev (CH) distance measure and Manhattan (MA) distance measure to perform agglomerative hierarchical clustering to generate hierarchical clusters (HCs). As understood, hierarchical clustering produces a hierarchy of the input data known as a tree/dendrogram, which is specific arrangement of input data into clusters. Each node of the tree/dendrogram contains one or more time-series ($X_i$) representing a cluster. The system 100 utilizes agglomerative hierarchical clustering which takes each input time-series as an individual cluster and then start successively merging pair of clusters having highest similarity between them until a single cluster is formed. Hence, hierarchical clustering technique measure similarities among the pair of time-series to put them into same cluster and measures linkage, i.e., the dissimilarities between the pair of groups of time-series to take the decision of further fusing the clusters. Once multiple HCs are generated, each based on one type of similarity measure used, a best HC is selected from among the HCs by applying modified Hubert Statistic ($\tau$) as internal clustering measure.

Further the HCs at the output of the system 100 are validated against benchmark result. A Rand Index (RI) measure, well known in art, is used as one of the external clustering validation measures to compare the performance HC generation of the system 100 with the benchmark results. RI is a cluster validation measure which considers all pairs of time-series and counts number of pairs assigned in same or different clusters formed by the system 100 to the true clusters based on the given labels. The validation is further described later in conjunction cluster validation process in conjunction with FIG. 4.

Figure 2B:
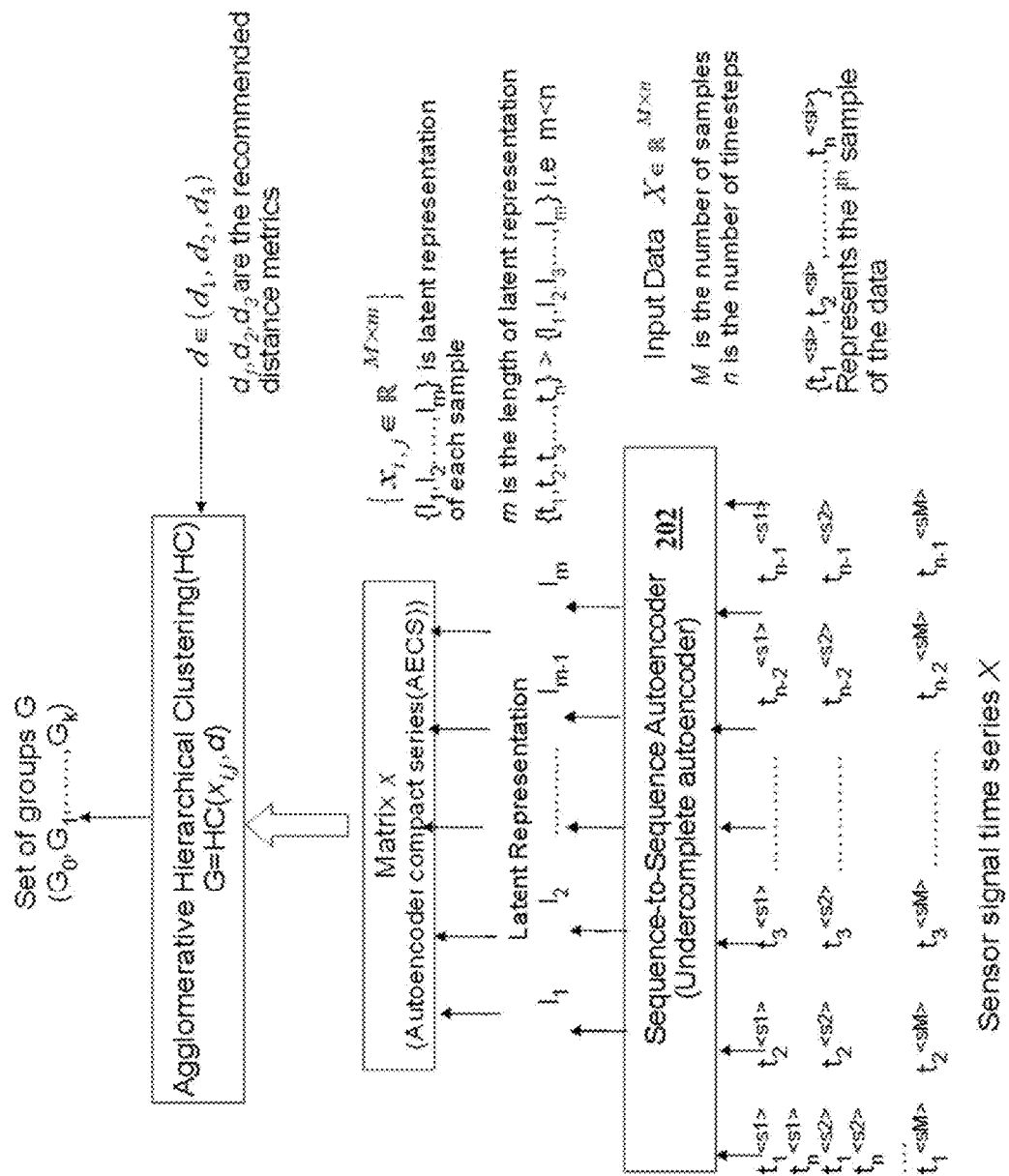
FIG. 2B illustrates an detailed functional architecture of the system of FIG. 1, in accordance with some embodiments of the present disclosure.

FIG. 2B illustrates an detailed functional architecture of the system of FIG. 1, in accordance with some embodiments of the present disclosure. As depicted the Seq2Seq LSTM auto encoder 202, alternatively referred as Seq2Seq auto encoder 202, receives a plurality of time-series (sample set of M time-series $X=\{X_1, X_2, \ldots X_M\}$) at input. The input data $X \in \mathbb{R}^{M \times n}$, where M is number of samples of time-series and n is number of steps of each time-series. Thus, the $i^{th}$ sample of the data is represented by $X_i=\{t_1^{<si>}, t_2^{<si>} \ldots t_n^{<si>}\}$. The Seq2Seq LSTM auto encoder 202 reduces the n step time-series to a m length sequence, where m remains constant for any length of time-series received at the input. Thus, the Seq2Seq LSTM auto encoder 202 provides a latent representation $l_1, l_2, \ldots l_n$ of each time-series, where m is length of the latent representation and $t_1, t_2, \ldots t_n > l_1, l_2, \ldots l_n$, thus m<n. The, the latent representation $l_1, l_2, \ldots l_n$ of each time-series from the sample set at input is maintained as a matrix X, wherein elements of matrix $x_{i,j} \in \mathbb{R}^{M \times m}$. Further, agglomerative hierarchical clustering is performed on this matrix using three different similarity measures, wherein the distance measure $d \in d_1, d_2, d_3$, wherein $d_1, d_2, d_3$ are recommended measures. Thus, multiple groups $G_1, G_2, G_3 \ldots$ based on each distance measure are obtained post processing the matrix of latent representation, wherein $G=HC(x_{i,j}, d)$. Based on the experiments conducted, the method disclosed herein identifies Chebyshev (CH) distance, Mahalanobis (ML) distance and Manhattan (MA) distance as best distance measures, as they provide best performance. The comparison of various distance measures with respect to Rand Index so as to narrow down on the CH, ML, MA is described in conjunction with FIG. 5.

Figure 3:
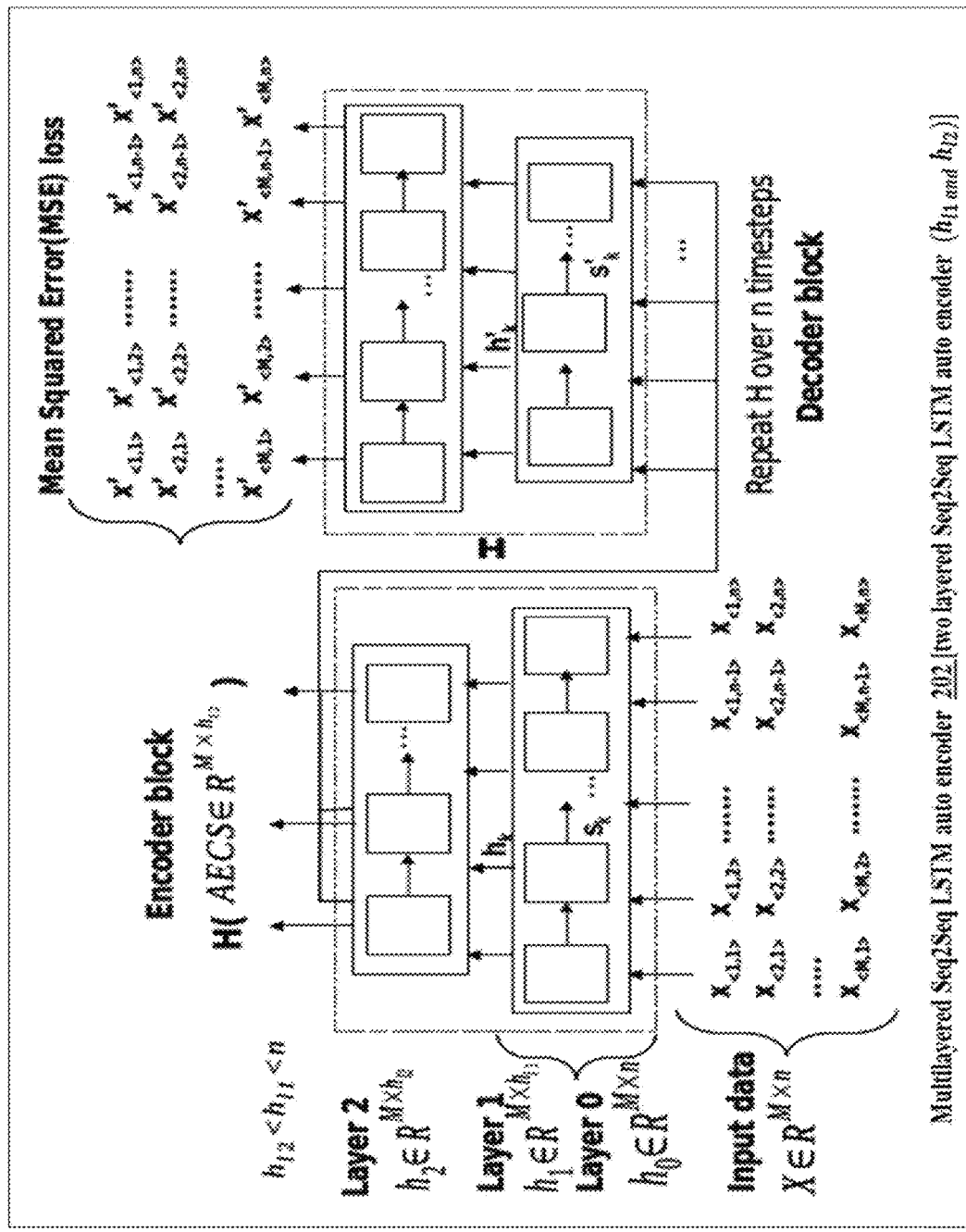
FIG. 3 illustrates an example two layered Seq2Seq Long Short-Term Memory (LSTM) auto encoder used by the system of FIG. 1, in accordance with some embodiments of the present disclosure.

FIG. 3 illustrates an example two layered Seq2Seq LSTM auto encoder 202 used by the system of FIG. 1 to generate AECS from the received time-series data, in accordance with some embodiments of the present disclosure. The system 100 is configured to learn a compact representation of each time-series time-series by using the two layered Seq2Seq LSTM auto encoder 202.

As depicted in FIG. 3, the first layer among the two layers of Seq2Seq LSTM auto encoder 202 comprises two step layering:

a) an input layer ($h_0$), where ($h_0 \in R^{M \times n}$) and 'n' is the length of the input layer b) a first hidden layer ($h_1$), where ($h_1 \in R^{M \times h_{l1}}$) and where ($h_{l1}$) is length of the first hidden layer.

As depicted in FIG. 3, the output of the first hidden layer is then provided to the second hidden layer ($h_2$), where ($h_2 \in R^{M \times h_{l2}}$), and where ($h_{l2}$) is length of the second hidden layer.

The input layer receives samples set of M time-series, with each series having 'n' time steps. Let $X=\{X_1, X_2, \ldots X_M\}$ be a set of M time-series, where $X_i=\{x_{i,1}, x_{i,2}, \ldots x_{i,n}\}$, re $x_{i,k}$ is the value of $i^{th}$ time-series' $k^{th}$ timestep, and n is the total number of timesteps or length of the time-series. In case of univariate time-series where $x_{i,k}$ is scalar and is vector in case of multi-variate time-series.

The input layer ($h_0$) converts the 'n' steps time-series into a 'n' length latent representation, followed by conversion of 'n' length latent representation to length ($h_{l1}$), which is the length of the first hidden layer, as an output of the first hidden layer. This output is then provided to the second hidden layer ($h_2$), where ($h_2 \in R^{M \times h_{l2}}$), and where ($h_{l2}$) is length of the second hidden layer.

The system 100, in one implementation utilizes AECS, wherein the AECS $\in R^{M \times h_{l2}}$, which is the latent representation of second hidden layer ($h_{l2}$) of the encoder. Thus, the second hidden layer converts the output of first hidden layer to the required AECS, of length ($h_{l2}$), where ($h_2 \in R^{M \times h_{l2}}$)). Thus, the length of AECS is:

($h_{l2}$)<a first hidden layer length ($h_{l1}$)<the length (n). Thus, the system 100 learns the compact representation having a length much less than the original time-series to reduce the computing time as well as to capture important characteristics of time-series. AECS is an undercomplete representation, hence bound to capture the important features of the input time-series.

Encoder: $H_i=f(X_i) \leftarrow h_{i,k}, s_{i,k} \leftarrow f_{LSTM}(h_{i,k-1}, s_{i,k-1}, x_{i,k})$; and Decoder: $X'_i=g(H_i) \leftarrow h'_{i,k}, s'_{i,k} \leftarrow f_{LSTM}(h'_{i,k-1}, s'_{i,k-1}, h_{i,k})$ (1)

Where, $X \in R^{M \times n} H \in R^{M \times l_{ev}}$ and $X' \in R^{M \times n}$, where $l_{ev}$ is length of the encoder vector. Typically, herein $l_{ev}$=length(AECS)= ($h_{l2}$). The reconstruction loss is $$\text{Mean Square Error}(MSE) = l_{recon} = \frac{1}{Mn} \sum_{i=1}^{M} \sum_{j=1}^{n} (x_{i,j} - x'_{i,j})^2,$$

where $X'_i$ is reconstructed output of $\{x'_{i,1}, x'_{i,2}, \ldots x'_{i,n}\}$ for $i^{th}$ instance.

Figure 4:
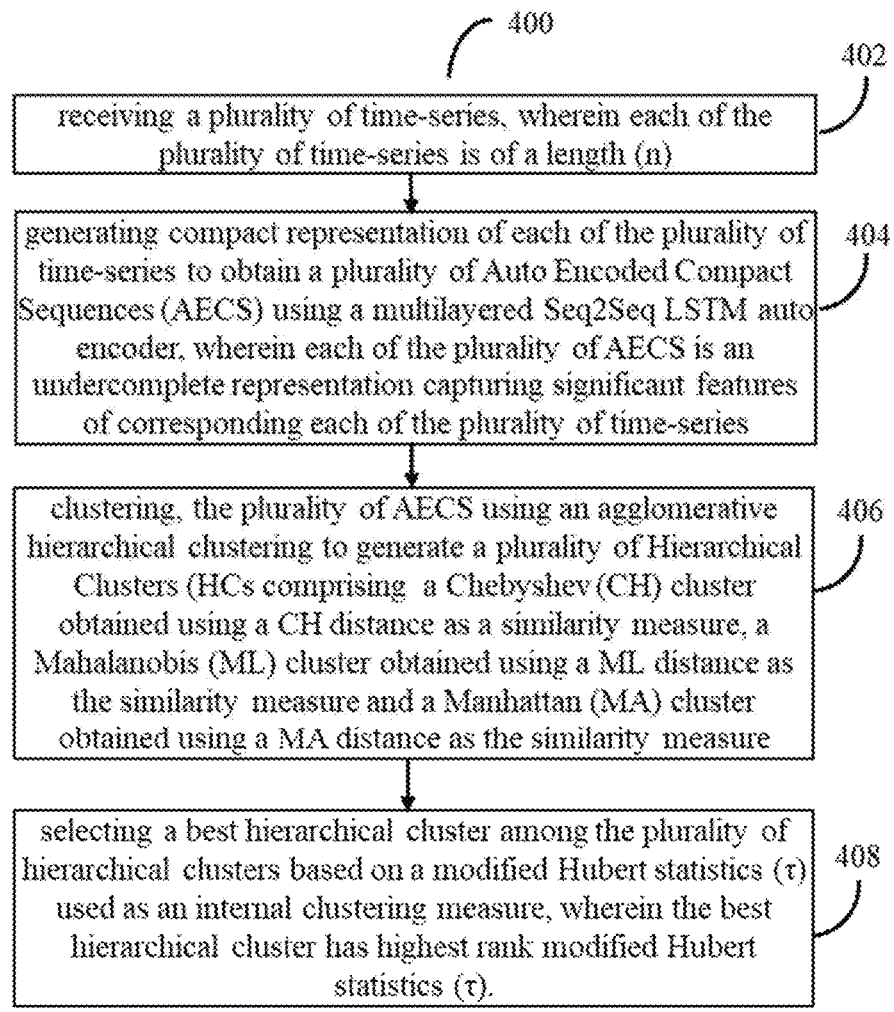
FIG. 4 is a flow diagram illustrating a method for hierarchical time-series clustering with Auto Encoded Compact Sequence (AECS) implemented using the system of FIG. 1, in accordance with some embodiments of the present disclosure.

FIG. 4 is a flow diagram illustrating a method 400 for hierarchical time-series clustering with Auto Encoded Compact Sequence (AECS) implemented using the system of FIG. 1, in accordance with some embodiments of the present disclosure.

In an embodiment, the system 100 comprises one or more data storage devices or the memory 102 operatively coupled to the processor(s) 104 and is configured to store instructions for execution of steps of the method 400 by the processor(s) or one or more hardware processors 104. The steps of the method 400 of the present disclosure will now be explained with reference to the components or blocks of the system 100 as depicted in FIG. 1, architectural overview of the system 100 as depicted in FIG. 2, the multilayered or two layered Seq2Seq LSTM auto encoder 202, the steps of flow diagram as depicted in FIG. 4 and experimental results and analysis depicted in FIGS. 5 through 8B. Although process steps, method steps, techniques or the like may be described in a sequential order, such processes, methods and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Referring to the steps of the method 400, at step 402, the one or more hardware processors 104 are configured to receive a plurality of time-series, wherein each of the plurality of time-series is of a length (n). The system 100 can process both the univariate time-series and the multivariate time-series.

At step 404, the one or more hardware processors 104 are configured to generate the compact representation of each of the plurality of time-series to obtain a plurality of Auto Encoded Compact Sequences (AECS) of a constant length using the multilayered Seq2Seq Long Short-Term Memory (LSTM) auto At step 404, the one or more hardware processors 104 are configured to encoder 202. Each of the plurality of AECS captures significant features of corresponding each of the plurality of time-series. As mentioned in FIG. 3 each of the plurality of AECS is a latent representation of second layer of the multilayer Seq2Seq LSTM auto encoder 202 with the second hidden layer length $h_{l2}$ with each of the AECS of predetermined length ($h_{l2}$). As described already in FIG. 3, the first hidden layer is preceded by the input layer ($h_0 \in R^{M \times n}$) of length (n) generating a (n) length latent representation of each of the plurality of time-series, wherein (n) length latent representation is further provided to the first hidden layer ($h_1$), where ($h_1 \in R^{M \times h_{l1}}$) with length ($h_{l1}$), and wherein the first hidden layer($h_1$) convets the (n) length latent representation to the latent representation of length ($h_{l1}$) provided to the second hidden layer ($h_2$), where ($h_2 \in R^{M \times h_{l2}}$). The length of AECS is:

($h_{l2}$)<a first hidden layer length ($h_{l1}$)<the length (n) of each of the plurality of time-series.

At step 406, the one or more hardware processors 104 are configured to cluster the plurality of AECS using an agglomerative hierarchical clustering to generate a plurality of Hierarchical Clusters (HCs), wherein each of the plurality of HCs is obtained using a similarity measure among a plurality of predefined similarity measures. The plurality of HCs comprise a Chebyshev (CH) cluster obtained using the CH distance as the similarity measure, a Mahalanobis (ML) cluster obtained using the ML distance as the similarity measure and a Manhattan (MA) cluster obtained using the MA distance as the similarity measure. During the process of hierarchical clustering, each node of the tree/dendrogram contains one or more time-series (Xi) representing a cluster. As mentioned earlier, in the agglomerative hierarchical clustering used herein, each input time-series is taken as an individual cluster and then starts successively merging pair of clusters having highest similarity between them until a single cluster is formed. Hence it measures similarities among the pair of time-series to put them into same cluster and measures linkage, i.e., the dissimilarities between the pair of groups of time-series to take the decision of further fusing the clusters. The system 102, utilizes average linkage technique, known in literature, to obtain pairwise inter-cluster dissimilarities. In average linkage, distance $a_d$ between clusters $C_0$ and $C_1$ is:

$$a_d(C_0 C_1) = \frac{1}{|C_0| \cdot |C_1|} \sum_{X_i \in C_0} \sum_{X_j \in C_1} \text{dist}(X_i, X_j) \quad (2)$$

Where, $|C_i|$ denotes the cardinality or the number of members in the clusters. The distance measures are used to find the similarity between two time-series CH, ML and MA.

Say $X_i = \{x_{i,1}, x_{i,n} x_{i,2}, \ldots\}$, and $X_j = \{x_{j,1}, x_{j,2}, \ldots x_{j,n}\}$ and $x_{i,k}$ and $X_{j,k}$ represent $k^{th}$ timestep of $i^{th}$ and $j^{th}$ time-series respectively. The same set of measures (CH, ML, MA)) are used to obtain average linkage among the clusters as well.

Even though any distance can be used, it was observed that experimental results indicated, CH, ML and MA distance measure were the best performers in term of computation efficiency.

$$a)\text{Chebyshev(CH)Distance: } \max_k(|x_{j,k} - x_{j,k}|) \quad (3)$$

Which is maximum distance between the two time steps in any single dimension.

$b$)Manhattan(MA)Distance:

$$\sum_{k=1}^{T} |x_{i,k} - x_{j,k}| \quad (4)$$

This belongs to Minkowski family which computes distance traveled to get from one data point to the other if a grid-like path is followed.

$$c)\text{Mahalanobis Distance:} \sqrt{(X_i - X_j) T \cdot C^{-1} \cdot (X_i - X_j)} \quad (5)$$

Finds the distance between two time steps in multidimensional space. Here $X_i$ and $X_j$ are two time-series and C is the co-variance matrix between $X_i$ and $X_j$.

At step 408, the one or more hardware processors 104 are configured to select the best hierarchical cluster (HC) among the plurality of HCs based on a modified Hubert statistics ($\tau$) used as an internal clustering measure, wherein the best hierarchical cluster has highest rank of the modified Hubert statistics ($\tau$). The modified Hubert statistic ($\tau$) evaluates sum of distance between each pair of AECS of each of the plurality of HCs weighted by a distance between centers of corresponding hierarchical clusters (HCs) they belong, and wherein the plurality of HCs are ranked based on the modified Hubert statistic ($\tau$) to select the best hierarchical cluster. Hubert statistic is used for calculating correlation between two matrix. The modified Hubert statistic, disclosed by the method herein, uses the proximity between the data points as first matrix and proximity between centers of clusters to which each point belongs as second matrix.

The Mahalanobis (ML) distance is used as distance measure to compute distance between each pair of AECS and the distance between the centers of the corresponding hierarchical clusters.

The best cluster has highest ($\tau$). The disagreements of pairs of time-series and separation between clusters is measured using ML (Mahalanobis) distance measure to evaluate ($\tau$).

$$\tau = \frac{2}{n(n-1)} \sum_{X_i \in X} \sum_{X_j \in X} d(X_i, X_j) d(c_i, c_j) \quad (6)$$

$$d(X_i, X_j) = d_{ML}(X_i, X_j) \text{ and } d(c_i, c_j) = d_{ML}(c_i, c_j) \quad (7)$$

Where, $c_i$ is centre of $i^{th}$ cluster $C_i$ and $d_{ML}(X_i, X_j)$ is the Mahalanobis distance between time-series $X_i$, and $X_j$; and $d_{ML}(c_i, c_j)$ is the Mahalanobis distance between $c_i$, $c_j$, the center of HC to which $X_i$, and $X_j$ belong.

---

Pseudo Code: HC-AECS (Hierarchical clustering with auto encoded compact latent representation):
Input:: Time-series: $X \in R^{M \times n}$, Number of time-series: M,
Sequence length: n, Encoder hidden layers length: $h_{l1}$, $h_{l2}$;
$(h_{l2}) < (h_{l1}) < (n)$ ; Number of clusters: K (optional).
Output:: Cluster with best distance/similarity measure
Procedure AECS (X, $h_{l1}$, $h_{l2}$, e, b, lr)
1: Create a multilayer auto-encoder using Eq. (1)
2: Get latent representation from l2 of encoder.
(AECS ← $H_{lstm}$ (X, $h_{l1}$, $h_{l2}$, e, b, lr, SGD)
3. return AECS $\in R^{M \times hl2}$
end Procedure
Procedure Cluster AECS (AECS, D={CH, MA, ML})
1: For distance metric $d_i$, in D do:
2: Perform Agglomerative Hierarchical clustering
with $d_i$, using average linkage function based on Eq.(2)
on AECS and save the clusters formed in C
C HC (AECS; k; $d_i$)
3: Store the clusters formed for the corresponding
distance measure for validation in Clusters.
Clusters[Cluster [$d_i$] ← C
4: return Clusters
end Procedure
Procedure BestCluster (Clusters, D={CH, MA, ML})
1: ← 0
2: $d_{best}$ ← null
3: $Fmax_\tau$ or distance metric $d_i$ in D do:
4:   C ← Cluster[$d_i$]
5:   $\tau$ ← modified Hubert Statistic C, based on
Eq.(6) and (7)
6:   If $max_\tau < \tau$ then:
7:     $d_{best}$ ← $\phi$
8:     $max_\tau$ ← $\tau$
9:     $d_{best}$ ← $d_i$
10:   Else If $max_\tau < \tau$ then:
11:     $d_{best}$ ← $d_{best} \cup d_i$
12:   end If
13: end For
14: return {Cluster[$d_{best_i}$], $d_{best_i}$ }, $\forall i$
end Procedure
End HC-AECS

---

Cluster validation: As depicted in FIG. 2 validation of clusters or HCs generated by the system 100 is validated using the Rand Index, which is one of the known external clustering validation measures to compare the performance of the HCs generated by the system 100 benchmark results. RI considers all pairs of time-series and counts number of pairs assigned in same or different clusters formed by the system with the true clusters based on the given labels.

$$RI = \frac{TP + TN}{TP + FP + FN + TN} \quad (8)$$

Where, the symbols denote cardinalities of sets of pairs: TP (truepositive) denotes elements which are assigned to same cluster that belongs to the same class; TN (true negative) denotes elements which are assigned to different clusters that belongs to different classes; FP (false positive) denotes elements which are assigned to different clusters that belongs to the same class; FN (false negative) denotes elements which are assigned to same cluster that belongs to different classes Experimental Analysis:

Data Description: For experimental analysis univariate and multivariate time-series from UCR Time-series Classification Archive is used to evaluate performance of the system 100. Description of univariate and multivariate time-series are presented in table I, and table II A and II B respectively. Each dataset has default train-test split. Herein, the train and test sets are merged, and Z-normalization is performed on the merged data.

TABLE I

Dataset # Train # Test Length # classes

DistalPhalanxOAG 400 139 80 3
DistalPhalanxOC 600 276 80 2
DistalPhalanxTW 400 139 80 6
MiddlePhalanxOAG 400 154 80 3
MiddlePhalanxOC 600 291 80 2
MiddlePhalanxTW 399 154 80 6
ProximalPhalanxOAG 600 291 80 2
ProximalPhalanxTW 400 205 80 6
Beef 30 30 470 5
Coffee 28 28 286 2
Fish 175 175 463 7
Ham 109 105 431 2
Strawberry 613 370 235 2
DiatomSizeReduction 16 306 345 4
Wine 57 54 234 2
ChlorineConcentration 467 3840 166 3
SyntheticControl 300 300 60 6
Two Patterns 1000 4000 128 4
CricketX 390 390 300 12
CricketY 390 390 300 12
CricketZ 390 390 300 12
ECG200 100 100 96 2
ECG5000 500 4500 140 5
ECGFiveDays 23 861 136 2
TwoLeadECG 23 1139 82 2
Lightning7 70 73 319 7
Plane 105 105 144 7
SonyAIBORobotSurface1 20 601 70 2
SonyAIBORobotSurface2 27 953 65 2
ArrowHead 36 175 251 3
SwedishLeaf 500 625 128 15
Yoga 300 3000 426 2
Car 60 60 577 4
GunPoint 50 150 150 2
Adiac 390 391 176 37
ToeSegmentation1 40 228 277 2
ToeSegmentation2 36 130 343 2
Wafer 1000 6164 152 2
FordB 3636 810 500 2
BME 30 150 128 3

TABLE II A

Results for multivariate datasets For UCR datasets

| Dataset | 1-NN | | | |
|---|---|---|---|---|
| | ED | DTW-I | DTW-D | HC-AECS |
| AtrialFibrillation | 0.267 | 0.267 | 0.267 | 0.517 |
| ERing | 0.133 | 0.133 | 0.133 | 0.709 |
| FingerMovement | 0.550 | 0.520 | 0.530 | 0.500 |
| HandMD | 0.278 | 0.306 | 0.231 | 0.539 |
| Handwriting | 0.2 | 0.316 | 0.286 | 0.890 |
| Libras | 0.833 | 0.894 | 0.87 | 0.863 |
| NATOPS | 0.85 | 0.85 | 0.883 | 0.723 |
| SelfRegulationSCP2 | 0.483 | 0.533 | 0.539 | 0.500 |
| StandWalkJump | 0.2 | 0.333 | 0.2 | 0.493 |

TABLE II B

Results for multivariate datasets for UCI datasets

| Dataset | MLSTM-FCN[1] | DTW | HC-AECS |
|---|---|---|---|
| Wafer(UCI) | 0.906 | 0.671 | 0.929 |
| Gesture Phase | 0.419 | 0.409 | 0.625 |

Latent representation: At first, auto-encoded compact representation is computed for time-series in accordance with the Pseudo code HC-AECS-procedure AECS stated earlier. Mean-Squared Error (MSE) is used as loss function and Stochastic Gradient Descent (SGD) known in art is used as optimizer with learning rate (lr) as 0.004 and default momentum as 0. A batch size of 32 is used. Length of hidden layers are $h_{l1}=16$, $h_{l2}=12$. Consider a representative dataset Adiac for better understanding. Adiac is an univariate time-series with 781 instances (M=781) where each time-series is of length 176 (n=176), so $X \in R^{781 \times 176}$. As h/2=12, compact representation for each Xi of Adiac is $ACES_{adiac} \in R^{781 \times 12}$.

Study on similarity measure and choice of best cluster: For analysis 7 different distance/similarity measures—Chebyshev, Cosine, Euclidean, Canberra, Manhattan, Mahalanobis and Cross-correlation. After extensive analysis it was concluded that Chebyshev, Manhattan and Mahalanobis perform better than the other measures on raw time-series as well as on the compact representation of time-series—AECS.

Figure 5:
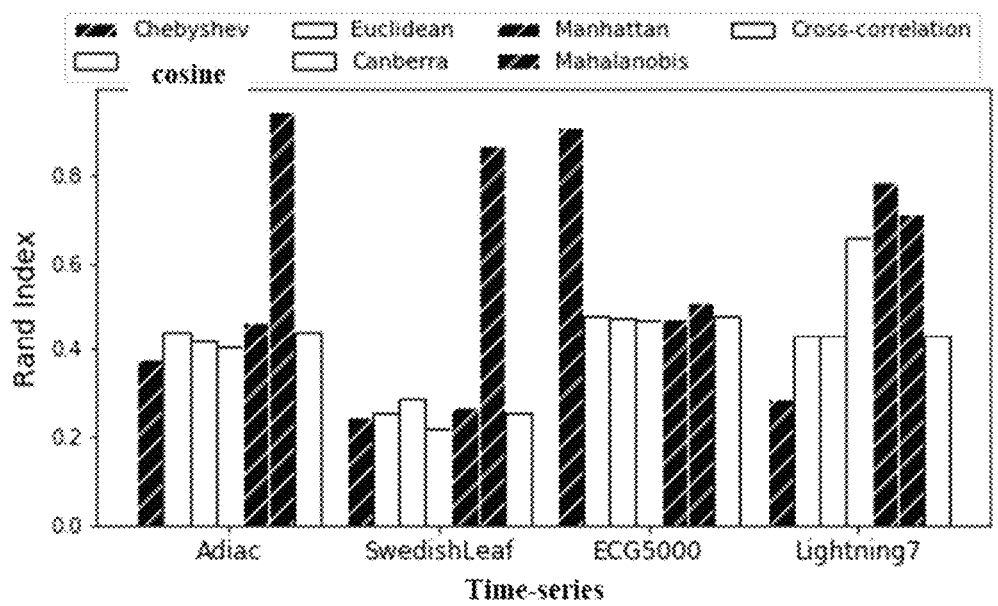
FIG. 5 is graphical analysis illustrating comparison of Rand Index (RI) of multiple similarity measures used to generate a Hierarchical Cluster (HC) using the system of FIG. 1, in accordance with some embodiments of the present disclosure.
Figure 7D:
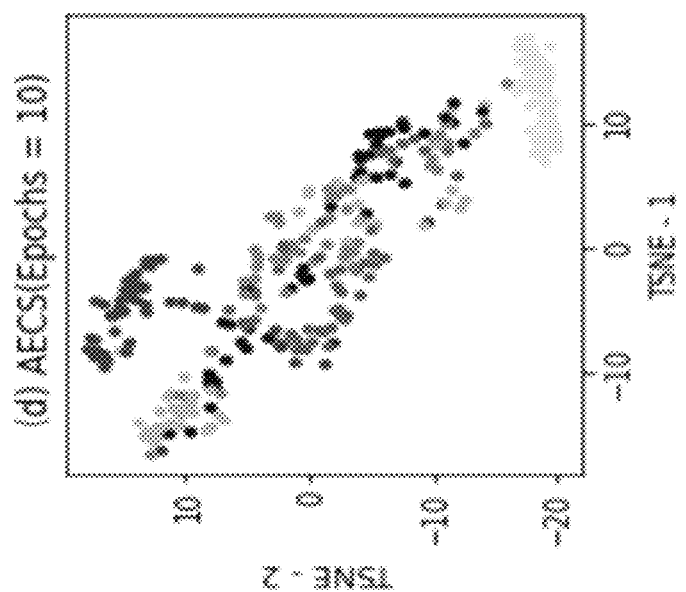
Figure 7C:
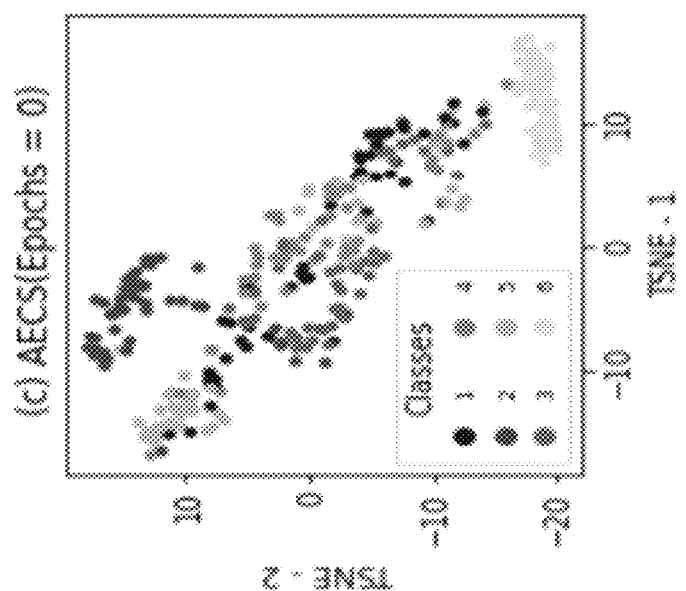

FIG. 5 is graphical analysis illustrating comparison of Rand Index (RI) of multiple similarity measures used to generate a Hierarchical Cluster (HC) using the system of FIG. 1, in accordance with some embodiments of the present disclosure. FIG. 5 depicts RI measures of HC on raw time-series using the above mentioned seven distance/similarity measures on four representative datasets. It is observed that either Chebyshev (CH), Manhattan (MA) and Mahalanobis (ML) performs best in each one of these datasets. Hence, the method and system disclosed prefers using Chebyshev, Manhattan and Mahalanobis as similarity measures. Next τ is calculated based on Eq.6 and Eq.7 and HC-AECS.BestCluster procedure on the clusters formed by above concluded three distance/similarity measures, $\tau_{CH}$ for CH, $\tau_{MA}$ for MA and for $\tau_{ML}$ ML. Extending the example presented of Adiac, for Adiac $\tau_{CH}=1:38$, $\tau_{MA}=1:56$, $\tau_{ML}=1:90$. Hence, clusters (HCs) corresponding to ML is chosen as best cluster as it has highest τ. While validation, it is observed that RI of clusters corresponding to ML is indeed the highest among the three RI measures (RI (CH)=0.698, RI (MA)=0.780, RI (ML)=0.926).

FIG. 6A and FIG. 6B illustrates analysis of a modified Hubert statistics (τ) with the RI for three similarity measures for three univariate time-series datasets and three multivariate time-series data sets respectively, in accordance with some embodiments of the present disclosure. Illustrated is the plot of τ vs RI for the said 3 distance/similarity measures on 3 univariate (DistalPhalanxOAG (DPOAG), CricketX, and SwedishLeaf) and 3 multivariate (Libras, HandMD and AttrialFibrillation (AtrialFib)) time-series. It can be observed that for each time-series, τ and RI are linearly dependent signifying best RI representing the best cluster has the highest τ using either CH, MA, ML. As depicted in the FIG. 6A for the univariate time-series CH produces the best cluster for DPOAG and ML produces best clusters for CricketX and SwedishLeaf. Whereas, as depicted in FIG. 6B, for multivariate time-series, CH performs best for HandMD, MA performs best for AttrialFib and ML performs best for Libras.

RESULTS: Compared is HC-AECS with important State-of-the-Arts clustering mechanisms on time-series like HC with parametric Dynamic Time Warping (DTW)-derivative (DDTW) (HCDDTW), and K-shape. Authors of 'HC with parametric Dynamic Time Warping (DTW)-derivative (DDTW) (HCDDTW)', have already established that they perform better than K-means hence K-means in not included in the analysis herein.

1) Analysis on univariate time-series: Comparison w.r.t State of the Art methods: Table III A, III B and III C depicts RI performance of HC-AECS, exploiting HC-AECS algorithm along with established State-of-the-Arts algorithms on clustering using the specified distance/similarity measures CH, MA, ML.

TABLE 3

| # Dataset, # HC-DDTW, # K-Shape, # HC-L CH, # HC-L MA, # HC-L ML, # HC-AECS CH RI, # HC-AECS CH τ, # HC-AECS MA RI, # HC-AECS MA τ, # HC-AECS ML RI, # HC-AECS ML τ |
|---|
| DistalPhalanxOC 0.527 0.500 0.527 0.527 0.502 0.527 0.01 0.527 0.01 0.509 0.01 |
| DistalPhalanxTW 0.862 0.700 0.814 0.812 0.593 0.885 1.31 0.846 1.21 0.560 1.18 |
| MiddlePhalanxOAG 0.729 0.733 0.390 0.387 0.518 0.702 1.08 0.688 0.98 0.509 0.96 |
| MiddlePhalanxOC 0.500 0.505 0.529 0.529 0.521 0.508 0.37 0.525 0.45 0.517 0.31 |
| MiddlePhalanxTW 0.802 0.719 0.713 0.796 0.673 0.830 1.48 0.795 1.35 0.502 0.96 |
| ProximalPhalanxOC 0.535 0.533 0.565 0.565 0.544 0.555 0.06 0.564 1.00 0.505 0.83 |
| ProximalPhalanxTW 0.880 0.769 0.792 0.794 0.596 0.822 1.18 0.844 1.31 0.594 1.05 |
| Beef 0.582 0.710 0.638 0.373 0.656 0.373 0.49 0.373 0.49 0.582 1.22 |
| Coffee 0.491 0.584 0.494 0.494 0.497 0.514 0.95 0.492 0.60 0.501 0.33 |
| Fish 0.181 0.817 0.435 0.448 0.740 0.531 1.04 0.591 1.20 0.556 1.14 |
| Ham 0.498 0.498 0.498 0.499 0.498 0.498 0.04 0.498 0.04 0.502 0.31 |
| Strawberry 0.504 0.500 0.509 0.523 0.540 0.500 0.46 0.500 0.45 0.541 1.00 |
| DiatomSizeReduction 0.296 0.908 0.296 0.306 0.575 0.758 1.09 0.763 0.99 0.604 0.97 |
| Wine 0.499 0.496 0.499 0.499 0.495 0.496 0.11 0.502 0.91 0.496 0.04 |
| ChlorineConcentration 0.403 0.533 0.403 0.413 0.416 0.507 1.02 0.493 0.88 0.509 1.10 |
| SyntheticControl 0.875 0.911 0.834 0.692 0.687 0.840 1.49 0.839 1.48 0.502 0.97 |
| TwoPatterns 0.848 0.691 0.255 0.556 0.484 0.557 0.99 0.635 1.35 0.514 1.05 |
| CricketX 0.777 0.862 0.123 0.709 0.820 0.548 1.10 0.551 1.11 0.773 1.65 |
| CricketY 0.688 0.862 0.114 0.748 0.841 0.557 1.09 0.547 1.07 0.724 1.53 |
| CricketZ 0.710 0.863 0.127 0.671 0.843 0.553 1.11 0.537 1.07 0.799 1.72 |
| ECG200 0.537 0.546 0.531 0.555 0.507 0.504 0.86 0.514 0.92 0.546 0.26 |
| ECGFiveDays 0.499 0.516 0.499 0.503 0.503 0.574 0.84 0.561 0.81 0.506 0.33 |
| ECG5000 0.891 0.667 0.910 0.474 0.509 0.744 1.33 0.849 1.58 0.528 1.07 |
| TwoLeadECG 0.500 0.501 0.500 0.500 0.500 0.501 0.17 0.501 0.17 0.501 0.00 |
| Lightning7 0.604 0.782 0.287 0.784 0.713 0.627 1.36 0.624 1.24 0.622 1.27 |
| Plane 1.000 0.948 0.902 0.838 0.735 0.690 1.21 0.719 1.29 0.667 1.29 |
| SonyAIBORobotSurface1 0.499 0.659 0.506 0.506 0.500 0.504 0.09 0.502 0.10 0.507 0.14 |
| SonyAIBORobotSurface2 0.534 0.558 0.534 0.527 0.514 0.585 0.92 0.598 0.93 0.526 0.01 |
| ArrowHead 0.349 0.601 0.344 0.344 0.533 0.341 0.06 0.343 0.08 0.474 0.80 |
| SwedishLeaf 0.348 0.925 0.245 0.269 0.869 0.400 0.73 0.422 0.78 0.805 1.70 |
| Yoga 0.504 0.500 0.500 0.500 0.502 0.503 0.35 0.503 0.39 0.502 0.00 |
| Car 0.498 0.699 0.509 0.496 0.403 0.608 1.37 0.606 1.37 0.507 1.21 |
| GunPoint 0.498 0.503 0.499 0.514 0.498 0.498 0.04 0.498 0.04 0.498 0.04 |
| Adiac 0.683 0.955 0.377 0.466 0.947 0.698 1.38 0.780 1.56 0.926 1.90 |
| ToeSegmentation1 0.505 0.498 0.499 0.498 0.498 0.499 0.94 0.501 1.00 0.499 1.00 |
| ToeSegmentation2 0.665 0.608 0.626 0.497 0.602 0.501 0.01 0.521 0.97 0.614 1.02 |
| Wafer 0.534 0.527 0.808 0.534 0.770 0.534 0.89 0.534 0.89 0.810 1.00 |
| FordB 0.500 0.523 0.500 0.500 0.500 0.500 0.94 0.500 0.94 0.500 0.01 |
| BME 0.611 0.687 0.559 0.559 0.555 0.707 1.21 0.707 1.21 0.504 0.83 |
| Wins or ties over HC-DDTW--HC-L (29/40), HC-AECS (30/40) |
| Wins or ties over K-Shape--HC-L (18/40) HC-AECS (20/40) |
| Wins or ties over HC-L---HC-AECS (24/40) |

Here, also the choice of best cluster is suggested based on τ and corresponding distance/similarity measure following our proposed method. Additionally, demonstrated is the performance of HC applied on raw data (HC-L) using the specified distance/similarity measures CH, MA, ML. Highest RI is indicated corresponding to the best distance measure in italics for HC-L and HC-AECS. Best RI achieved using all algorithms has been marked in bold. In summary, 75% cases HC-AECS outperforms HC-DDTW the benchmark hierarchical clustering method and remains within the range of 0.001 to 0.281 with average variation of 0.065, and also 50% cases outperforms K-Shape remains within the range 0.005 to 0.229 with average variation of 0.1. Also compared is performance of the method disclosed herein with existing benchmark classification results using 14 representative time-series in table IV.

TABLE IV

| Dataset | HC-AECS (RI) | Benchmark [25] Accuracy | Algo |
|---|---|---|---|
| DistalPhalanxOAG | 0.657 | 0.826 | HIVE-COTE |
| DistalPhalanxTW | 0.823 | 0.698 | HIVE-COTE |
| MiddlePhalanxTW | 0.793 | 0.589 | SVML |
| ProximalPhalanxTW | 0.802 | 0.816 | RandF |
| SyntheticControl | 0.839 | 0.999 | HIVE-COTE |
| CricketX | 0.720 | 0.830 | HIVE-COTE |
| CricketY | 0.762 | 0.837 | HIVE-COTE |
| CricketZ | 0.762 | 0.848 | HIVE-COTE |
| ECG5000 | 0.795 | 0.947 | HIVE-COTE |
| Lightning7 | 0.641 | 0.811 | HIVE-COTE |
| Adiac | 0.937 | 0.815 | HIVE-COTE |
| SwedishLeaf | 0.848 | 0.968 | HIVE-COTE |
| Wafer | 0.795 | 1.000 | ST |
| Plane | 0.775 | 1.000 | HIVE-COTE |

The benchmark results for a dataset are reported for the algorithm which performs best among the 38 algorithms compared in one of the known works. In this case HC-AECS is applied on the given test data as benchmark accuracy are reported for test data only. Here, also HC-AECS generates very close classification benchmark results and outperforms in multiple cases. In the cases where classification results are higher, HC-AECS only vary 0.12 in average (approximately 14%) from benchmark classification results. The cases where test data contains a smaller number of samples like DistalPhalanxOAG (139 test samples) and Lightning7 (73 test samples), HC-AECS lags behind. FIGS. 7A, 7B, 7C and 7D depict two dimensional representation of generated AECS using the multilayered Seq2Seq LSTM auto encoder, in accordance with some embodiments of the present disclosure. t-SNE is used to obtain 2-D plot for visualization. Two representative time-series ECGFivedays (univariate) and ERing (multivariate) are considered here.

Figure 8A:
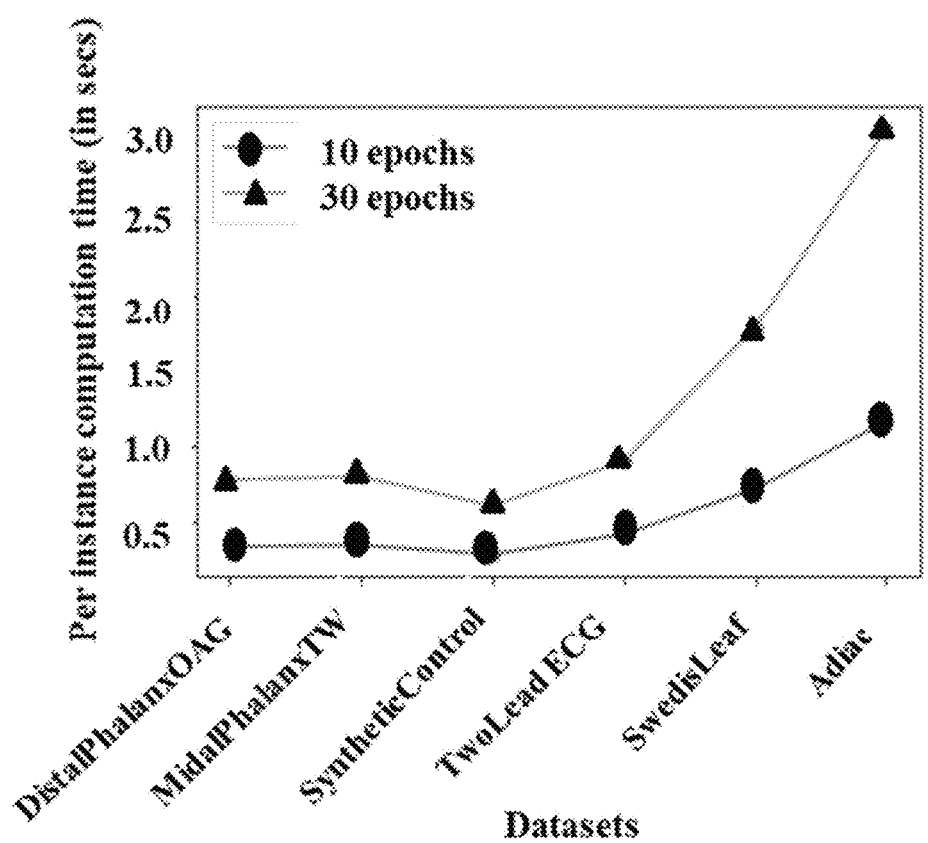
FIGS. 8A and 8B depicts comparison of computation time for HCs generated using the system of FIG. 1 and benchmark HC algorithms, in accordance with some embodiments of the present disclosure.
Figure 8B:
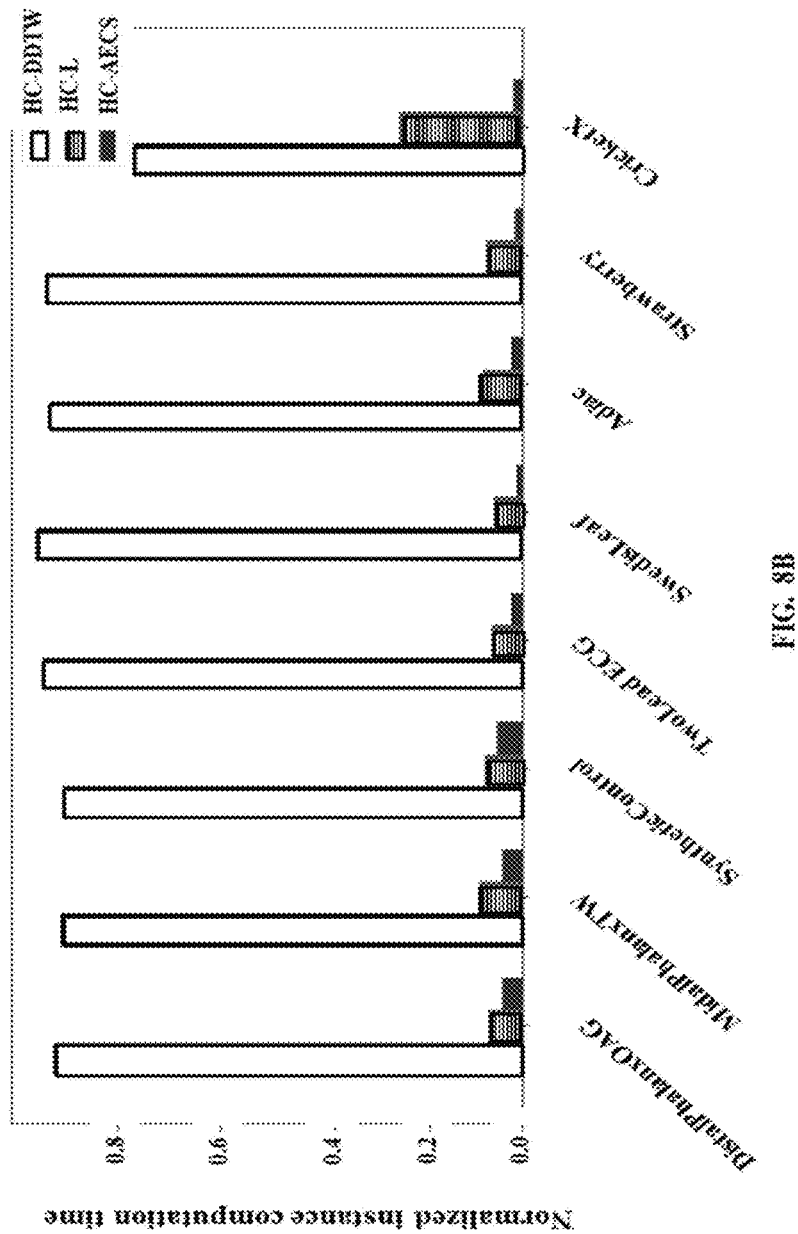

2) Computational time for HC-AECS: HC-AECS consumes much less computation time as compared to HCDDTW and HC with raw time-series data due to compact representation and specific distance measure. HC-DDTW requires a lot of computation power as performing DTW between two time-series of sequence length n takes $O(n^2)$ time. So, time taken for finding DTW between every pair of time-series reaches quadratic time complexity. On the other hand, all the distance measures used in our algorithm take lesser time to find similarity between two time-series. FIGS. 8A and 8B depicts comparison of computation time for HCs generated using the system of FIG. 1 and benchmark HC algorithms, in accordance with some embodiments of the present disclosure. FIG. 8B presents comparisons of computing time among HCDDTW, HC-L and HC-AECS all methods exploiting hierarchical clustering approaches. Here per instance cluster time is computed for the algorithms, which is total time taken divided by number of instances in the dataset. The time required by HC-AECS can be divided into three parts: (a) time required to get AECS:($t_{aecs}$), (b) time required for clustering($t_c$), (c) time taken to choose best distance metric($t_v$). FIG. 8A depicts computing time difference between epoch 10 and epoch 30. From the results, it can be observed that the computation time required for HC-AECS (disclosed method) is approximately 27 times less than HC-DDTW. The time difference becomes more apparent in comparatively larger datasets like Adiac where HC-AECS performs almost 47 times faster than HC-DDTW. At the same time, $t_{aecs}$ does not vary significantly even with increase in epochs.

3) Analysis on multivariate time-series: HC-AECS on 7 representative multivariate datasets out of 30 from UCR is performed and the results provided by the system 100 were compared with benchmark classification algorithms like 1-NN using Euclidean distance(1NN-ED), dimension-independent DTW(1NN-DTWI) and dimension dependent DTW (1NN-DTWD) as presented in table V.

TABLE V

| Dataset | 1-NN ED | 1-NN $DTW_I$ | 1-NN $DTW_D$ | HC-AECS |
|---|---|---|---|---|
| AtrialFibrillation | 0.267 | 0.267 | 0.267 | 0.517 |
| ERing | 0.133 | 0.133 | 0.133 | 0.709 |
| FingerMovement | 0.550 | 0.520 | 0.530 | 0.500 |
| HandMD | 0.278 | 0.306 | 0.231 | 0.539 |
| Handwriting | 0.2 | 0.316 | 0.286 | 0.890 |
| Libras | 0.833 | 0.894 | 0.87 | 0.863 |
| NATOPS | 0.85 | 0.85 | 0.883 | 0.723 |

It can be seen that 4 out of 7 datasets, the HC-AECS better than the benchmark algorithms.

Thus, unlike, conventional hierarchical time-series clustering, which is highly time consuming process considering length of time-series the method disclosed herein provides a time efficient and cost efficient approach. Further, it is challenging to find right similarity measure providing best possible hierarchical cluster (HC) on-the-fly. The method and system providing AECS based hierarchical time-series clustering enables compact latent representation of both univariate and multivariate time-series using an undercomplete multilayered Seq2Seq LSTM auto encoder followed generating Hierarchical Clusters (HCs) of the time-series using similarity measure. Further, provided is a mechanism to select the best HC from multiple HCs generated using multiple similarity measure. The best cluster is selected based on an internal clustering performance measure of Modified Hubert statistic τ. The method can address high computational cost problem of hierarchical clustering of time-series for both on univariate and multivariate time-series. Further the AECS approach provides a constant length sequence across diverse length series and hence provides a generalized approach. Presence of longer sequence length time-series are frequent in healthcare, machine and manufacturing, and smart-city application domains, thus the approach disclosed by the method is appropriate to be used during analysis of such long and diverse length time-series analysis by representing each time-series as a compact sequence, which is constant across diverse length of time-series.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for Auto Encoded Compact Sequences (AECS) based hierarchical time-series clustering, the method comprising:
   receiving, via one or more hardware processors, a plurality of time-series, wherein each of the plurality of time-series is of a length (n);
   generating, via the one or more hardware processors, compact representation of each of the plurality of time-series to obtain a plurality of Auto Encoded Compact Sequences (AECS) of a constant length using a multilayered Seq2Seq Long Short-Term Memory (LSTM) auto encoder, wherein each of the plurality of AECS captures significant features of corresponding each of the plurality of time-series;
   clustering, via the one or more hardware processors, the plurality of AECS using an agglomerative hierarchical clustering to generate a plurality of Hierarchical Clusters (HCs comprising a Chebyshev (CH) cluster obtained using a CH distance as a similarity measure, a Mahalanobis (ML) cluster obtained using a ML distance as the similarity measure and a Manhattan (MA) cluster obtained using a MA distance as the similarity measure; and
   selecting, via the one or more hardware processors, a best HC among the plurality of HCs based on a modified Hubert statistics ($\tau$) used as an internal clustering measure, wherein the best hierarchical cluster has highest rank of modified Hubert statistics ($\tau$).

2. The method of claim 1, wherein each of the plurality of AECS is a latent representation of second layer of the multilayer Seq2Seq LSTM auto encoder with a second hidden layer length ($h_{l2}$) with each of the AECS of predetermined length ($h_{l2}$), wherein
   ($h_{l2}$)<a first hidden layer length ($h_{l1}$)<the length (n) of each of the plurality of time-series.

3. The method of claim 1, wherein the modified Hubert statistic ($\tau$) evaluates sum of distance between each pair of AECS of each of the plurality of HCs weighted by a distance between centers of corresponding HCs they belong to, and wherein the plurality of HCs are ranked based on the modified Hubert statistic ($\tau$) to select the best hierarchical cluster.

4. The method of claim 3, wherein a Mahalanobis (ML) distance is used as distance measure to compute distance between each pair of AECS and the distance between the centers of the corresponding hierarchical clusters.

5. The method of claim 1, wherein the plurality of time-series is one of a univariate time-series and a multivariate time-series.

6. The method of claim 1, wherein the first hidden layer is preceded by an input layer ($h_0 \in R^{M \times n}$) of length (n) generating a (n) length latent representation of each of the plurality of time-series, wherein (n) length latent representation is further provided to the first hidden layer ($h_1$), where ($h_1 \in R^{M \times h_{l1}}$) with length ($h_{l1}$), and wherein the first hidden layer ($h_1$) convets the (n) length latent representation to the latent representation of length ($h_{l1}$) provided to the second hidden layer ($h_2$), where ($h_2 \in R^{M \times h_{l2}}$).

7. A system for Auto Encoded Compact Sequences (AECS) based hierarchical time-series clustering, the system comprising:
   a memory storing instructions;
   one or more Input/Output (I/O) interfaces; and one or more hardware processors coupled to the memory via the one or more I/O interfaces, wherein the one or more hardware processors are configured by the instructions to:

receive a plurality of time-series, wherein each of the plurality of time-series is of a length (n);

generate compact representation of each of the plurality of time-series to obtain a plurality of Auto Encoded Compact Sequences (AECS) of a constant length using a multilayered Seq2Seq Long Short-Term Memory (LSTM) auto encoder, wherein each of the plurality of AECS captures significant features of corresponding each of the plurality of time-series;

cluster the plurality of AECS using an agglomerative hierarchical clustering to generate a plurality of Hierarchical Clusters (HCs comprising a Chebyshev (CH) cluster obtained using a CH distance as a similarity measure, a Mahalanobis (ML) cluster obtained using a ML distance as the similarity measure and a Manhattan (MA) cluster obtained using a MA distance as the similarity measure; and select a best HC among the plurality of HCs based on a modified Hubert statistics ($\tau$) used as an internal clustering measure, wherein the best hierarchical cluster has highest rank of modified Hubert statistics ($\tau$).

8. The system of claim 7, wherein each of the plurality of AECS is a latent representation of second layer of the multilayer Seq2Seq LSTM auto encoder with a second hidden layer length ($h_{l2}$) with each of the AECS of predetermined length ($h_{l2}$), wherein ($h_{l2}$)<a first hidden layer length ($h_{l1}$)<the length (n) of each of the plurality of time-series.

9. The system of claim 7, wherein the modified Hubert statistic ($\tau$) evaluates sum of distance between each pair of AECS of each of the plurality of HCs weighted by a distance between centers of corresponding HCs they belong to, and wherein the plurality of HCs are ranked based on the modified Hubert statistic ($\tau$) to select the best hierarchical cluster.

10. The system of claim 9, wherein a Mahalanobis (ML) distance is used as distance measure to compute distance between each pair of AECS and the distance between the centers of the corresponding hierarchical clusters.

11. The system of claim 7, wherein the plurality of time-series is one of a univariate time-series and a multivariate time-series.

12. The system of claim 7, wherein the first hidden layer is preceded by an input layer ($h_0 \in R^{M \times n}$) of length (n) generating a (n) length latent representation of each of the plurality of time-series, wherein (n) length latent representation is further provided to the first hidden layer ($h_1$), where ($h_1 \in R^{M \times h_{l1}}$) with length ($h_{l1}$), and wherein the first hidden layer ($h_1$)convets the (n) length latent representation to the latent representation of length ($h_{l1}$) provided to the second hidden layer ($h_2$), where ($h_2 \in R^{M \times h_{l2}}$).

13. One or more non-transitory machine readable information storage mediums comprising one or more instructions, which when executed by one or more hardware processors causes a method for hierarchical time-series clustering with Auto Encoded Compact Sequence (AECS), the method comprising:

receiving a plurality of time-series, wherein each of the plurality of time-series is of a length (n);

generating compact representation of each of the plurality of time-series to obtain a plurality of Auto Encoded Compact Sequences (AECS) of a constant length using a multilayered Seq2Seq Long Short-Term Memory (LSTM) auto encoder, wherein each of the plurality of AECS captures significant features of corresponding each of the plurality of time-series;

clustering the plurality of AECS using an agglomerative hierarchical clustering to generate a plurality of Hierarchical Clusters (HCs comprising a Chebyshev (CH) cluster obtained using a CH distance as a similarity measure, a Mahalanobis (ML) cluster obtained using a ML distance as the similarity measure and a Manhattan (MA) cluster obtained using a MA distance as the similarity measure; and selecting a best HC among the plurality of HCs based on a modified Hubert statistics ($\tau$) used as an internal clustering measure, wherein the best hierarchical cluster has highest rank of modified Hubert statistics ($\tau$).

* * * * *